(12) United States Patent
Cohen

(10) Patent No.: US 10,842,319 B2
(45) Date of Patent: Nov. 24, 2020

(54) FOOD IMPRINTING DEVICE

(71) Applicant: ONBREAD Ltd., Lapid (IL)

(72) Inventor: Gilad Cohen, Lapid (IL)

(73) Assignee: ONBREAD LTD., Lapid (IL)

( * ) Notice: Subject to any disclaimer, the term of this patent is extended or adjusted under 35 U.S.C. 154(b) by 25 days.

(21) Appl. No.: 16/031,609

(22) Filed: Jul. 10, 2018

(65) Prior Publication Data

US 2018/0317711 A1    Nov. 8, 2018

Related U.S. Application Data

(63) Continuation-in-part of application No. 15/302,206, filed as application No. PCT/IL2015/050003 on Jan. 1, 2015, now abandoned.

(60) Provisional application No. 62/530,777, filed on Jul. 10, 2017.

(30) Foreign Application Priority Data

Apr. 10, 2014  (IL) .......................................... 232080

(51) Int. Cl.
| | |
|---|---|
| *A47J 37/08* | (2006.01) |
| *A23P 30/10* | (2016.01) |
| *A21C 15/00* | (2006.01) |
| *A21D 13/47* | (2017.01) |
| *A21D 13/43* | (2017.01) |

(52) U.S. Cl.
CPC ........... *A47J 37/0892* (2013.01); *A21C 15/00* (2013.01); *A21D 13/43* (2017.01); *A21D 13/47* (2017.01); *A23P 30/10* (2016.08)

(58) Field of Classification Search
CPC ........ A21C 15/00; A21D 13/43; A21D 13/47; A23P 30/10; A47J 37/0892; B29C 2045/1758; B29C 45/2632; B29C 2045/264; B29C 2045/2636; A23G 3/0025; A23G 3/0252
USPC ........................................................ 425/425
See application file for complete search history.

(56) References Cited

U.S. PATENT DOCUMENTS

| | | | |
|---|---|---|---|
| 4,223,204 | A | 9/1980 | Benedict |
| 5,156,637 | A | 10/1992 | Wai-Ching |
| 5,996,476 | A | 12/1999 | Schultz |

(Continued)

FOREIGN PATENT DOCUMENTS

| | | |
|---|---|---|
| CN | 101589735 A | 12/2009 |
| DE | 4036560 A1 | 5/1991 |

(Continued)

OTHER PUBLICATIONS

International Search Report of PCT/IL2015/050003 Completed May 12, 2015; dated May 18, 2015 3 Pages.

(Continued)

*Primary Examiner* — Matthew J Daniels
*Assistant Examiner* — Yunju Kim
(74) *Attorney, Agent, or Firm* — The Roy Gross Law Firm, LLC; Roy Gross

(57) ABSTRACT

A food imprinting system including at least one imprint block, and a mounting plate having at least one opening dimensioned for receiving at least a forward portion including a printing face of the imprint block, wherein the imprint block and the mounting plate are mounted within an imprinting assembly.

19 Claims, 13 Drawing Sheets

(56) References Cited

U.S. PATENT DOCUMENTS

| 7,331,776 B2* | 2/2008 | Errera | A21C 11/02 |
| | | | 249/142 |
| 2001/0046535 A1 | 11/2001 | Owling | |
| 2004/0151807 A1 | 8/2004 | Damsgard | |
| 2006/0182859 A1* | 8/2006 | Arend | A21C 11/02 |
| | | | 426/503 |
| 2011/0287153 A1 | 11/2011 | Zimmer | |
| 2012/0323363 A1 | 12/2012 | Testuro et al. | |

FOREIGN PATENT DOCUMENTS

| EP | 1477066 A1 | 11/2004 |
| WO | 2009021310 A1 | 2/2009 |

OTHER PUBLICATIONS

Written Opinion of PCT/IL2015/050003 Completed May 12, 2015; dated May 18, 2015 4 Pages.

* cited by examiner

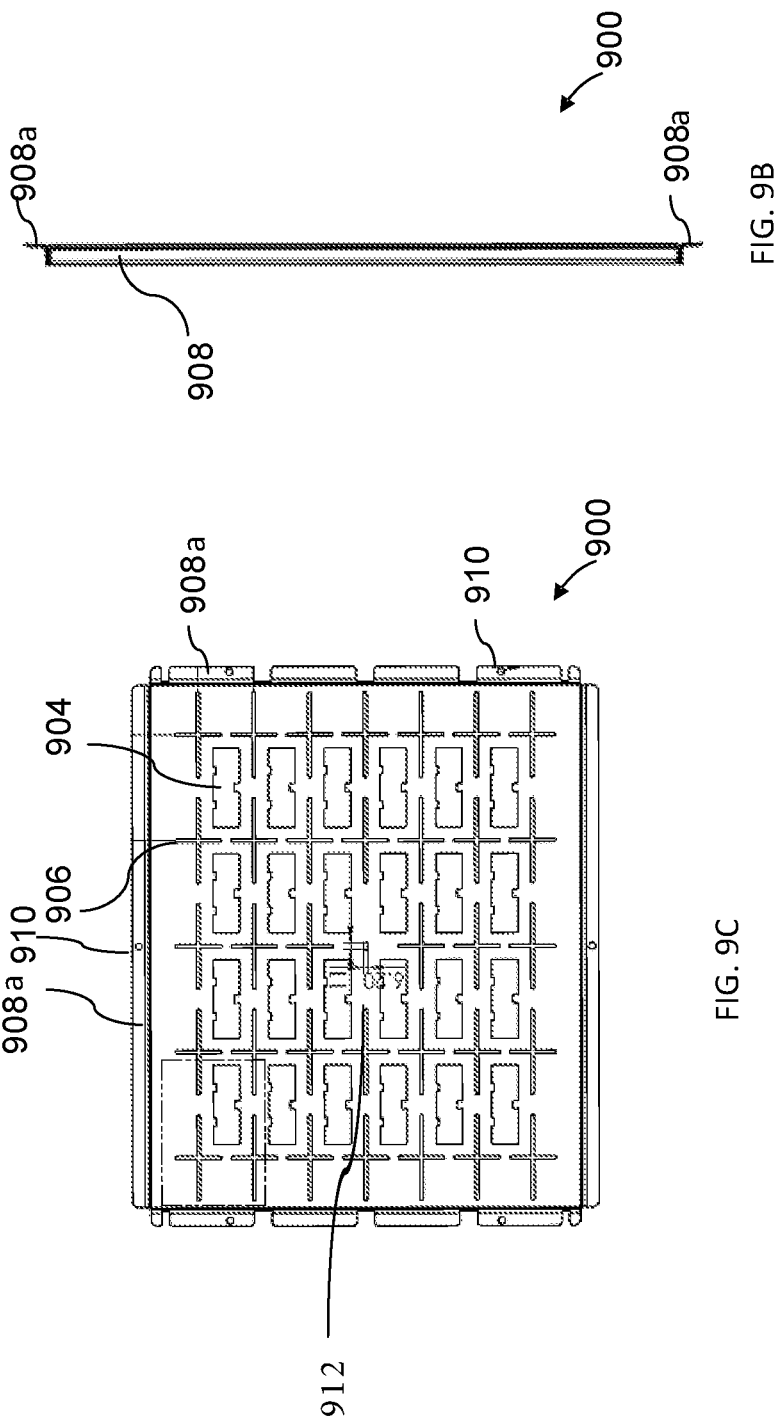

FOOD IMPRINTING DEVICE

RELATED APPLICATIONS

This application is a Continuation-in-Part (CIP) of U.S. patent application Ser. No. 15/302,206 filed on Oct. 6, 2016 which is a national phase patent application of PCT Patent Application No. PCT/IL2015/050003 filed on Jan. 1, 2015, which claims the benefit of priority under 35 USC § 119(e) of IL Patent Application No. 232080 filed on Apr. 10, 2014.

This application also claims the benefit of priority from U.S. Provisional Patent Application No. 62/530,777 filed on Jul. 10, 2017. The contents of the above applications are all incorporated by reference as if fully set forth herein in their entirety.

FIELD OF THE INVENTION

The present invention relates to the field of impression devices. More particularly, the invention relates to an imprinting device designed to create images upon a variety of food products for decoration and/or marketing purposes, in particularly baked dough products such as flat bread or pitta.

BACKGROUND

It is sometimes desired by food products manufacturers to bring an added value and uniqueness to their product. This can be achieved by creating images (e.g., logo, letters, numbers, etc.) upon a variety of their food products for decoration and/or marketing purposes.

There are numerous known methods for transferring pictorial or written representations onto food items, using, for example, imprinting, pressing or embossing techniques. Such techniques typically involve direct contact and application of pressure and/or heat to the surface of the product. However, food products frequently have size, shape and/or surface variations, even among items produced in the same batch. These natural variations present unique challenges when attempting to automate and mechanize the imprinting process. In addition, many food products tend to be relatively delicate and have easily penetrable outer layers. This may lead to uneven imprinting results, and even potential damage to the product itself.

The foregoing examples of the related art and limitations related therewith are intended to be illustrative and not exclusive. Other limitations of the related art will become apparent to those of skill in the art upon a reading of the operation and a study of the figures.

SUMMARY

The following embodiments and aspects thereof are described and illustrated in conjunction with systems, tools and methods which are meant to be exemplary and illustrative, not limiting in scope.

According to one aspect of the invention there is provided a food imprinting system including one or more one imprint block, and a mounting plate having one or more one opening dimensioned for receiving one or more a forward portion including a imprinting face of the one or more one imprint block, wherein the imprint block and the mounting plate are mounted within an imprinting assembly. In some embodiments, the imprinting assembly is coupled to an imprinting driver configured for moving the imprinting assembly along one or more one axis. In some embodiments, the imprinting assembly is installed within a support frame including a support table, wherein the support table defines a plane which is substantially parallel to a plane defined by the imprinting face, and wherein the imprinting assembly driver is configured for driving the imprinting assembly relative to the support table. In some embodiments, the imprinting assembly driver is configured for driving the support table relative to the imprinting assembly.

According to some embodiments, the mounting plate is made of a material configured for withstanding operating temperatures of up to 600° C. In some embodiments, the one or more one opening is dimensioned to form an air gap around the forward portion of the imprint block, wherein the air gap has a length of one or more 0.1. In some the system further includes a plurality of elongated through slots distributed substantially evenly about the mounting plate, wherein each slot has a length of between 50 and 150 mm and a width of between 2 and 6 mm. In some embodiments, one or more some of the slots include an elongated rod coupled at one or more ends of the slots and oriented along the slots.

According to some embodiments, one or more some of the slots includes an elongated rod that traverses the slots and is coupled at one or more sides of the slots. In some embodiments, the rod is made of a material having a coefficient of thermal expansion which is different to that of the mounting plate. In some embodiments, the rod is made of a material having a coefficient of thermal expansion which is different to that of the mounting plate. In some embodiments, the mounting plate further includes a lip formed along one or more a portion of a perimeter of the mounting plate, the lip extends substantially perpendicular to a plane defined by the mounting plate, and wherein the lip has a height of one or more 10 mm.

According to some embodiments, the lip further includes a flange section which is oriented at a right angle to and outwardly away from the lip, wherein the flange has a width of one or more 10 mm. In some embodiments, the flange section includes one or more mounting holes. In some embodiments, the imprint block includes a shoulder extending outwardly relative to the forward portion of the imprint block, and the shoulder is dimensioned to be larger than the opening in the mounting plate for preventing passage of the shoulder therethrough. In some embodiments, the system includes a support ring disposed between the mounting plate and the imprint block shoulder. In some embodiments, the support ring is dimensioned to form an air gap around the forward portion of the imprint block, wherein the air gap has a width of one or more 0.1 mm.

According to some embodiments, the support ring has a rim height of between 3 and 10 mm, and a rim width of one or more 2 mm. In some embodiments, the support ring is integrally formed with the mounting plate.

According to an aspect of the invention there is provided a system for replacing a hot food imprinting blocks mounting plate, without cooling down including a rail assembly including one or more two opposed rails, and a mounting plate including a planar plate having a plurality of openings dimensioned for receiving a forward portion including a imprinting face of a corresponding plurality of imprint blocks, wherein the rails are dimensioned for slidingly receiving opposed edges of the mounting plate.

According to some embodiments, the rails have a U-shaped cross-sectional profile. In some embodiments, the rail assembly further includes a third rail disposed transversely relative to the two opposed rails, wherein the third rail is dimensioned for slidingly receiving an edge of the mounting plate which is transverse to the opposed edges. In some embodiments, one or more the two opposed rails are slidingly removable from the rail assembly when the opposed edges are received therein.

According to some embodiments, the rails include one or more holes configured to receive a locking pin. In some embodiments, the holes allow for expansion and contraction of said mounting plate when coupled to the rails.

In some embodiments, the mounting plate to the rails allows for expansion and contraction of the mounting plate. In some embodiments, the mounting plate is slidable in and out of said rails when hot.

In some embodiments, the invention provides a food imprinting device, comprising at least one heat imprinting unit having a heatable imprinting thead adapted to receive a supply of heat energy from a heating source, for searing the surface of a food product that comes in contact with said heatable imprint head, by applying a necessary heat of at least 100 degrees Celsius and/or pressure of less than 25 seconds to said food product.

In one aspect, the food imprinting device further comprises at least one tray for supporting the food product. The heat imprinting unit can be mounted to a stand above, under or aside the tray.

According to an embodiment of the invention, at least one heat imprinting unit includes a manipulator on which the heatable imprint head is mounted, wherein said manipulator being movable in one or more degrees of freedom for accurately positioning the imprint head over a target food product. The manipulator is activated manually or automatically.

According to some embodiment of the invention the food imprinting system includes a release plate. In some embodiments, the release plate is configured to weigh down food items to a common height. In some embodiments, the release plate is configured to prevent food items from lifting when said mounting plate and imprinting blocks are raised.

According to an embodiment of the invention, the heatable imprint head is a plate having a relief that forms an image on the outer surface of said plate.

According to an embodiment of the invention, the heatable imprint head is replaceable or non-replaceable.

According to an embodiment of the invention, the manipulator is controlled and activated by computerized module.

In one aspect, the at least one tray is disposed on a table (e.g. conveyor) to be carried thereon.

According to an embodiment of the invention, the at least one tray having at least one cavity adapted for holding a food product therein.

According to an embodiment of the invention, the food imprinting device further comprises a controller for automatically controlling processing of the foodstuffs.

According to an embodiment of the invention, the tray is mounted on a base that defines a first arm and the heat imprinting unit is mounted on a frame that defines a second arm, such that both arms are joined by a hinge area which allows said arms to come together to close in order to apply the necessary heat and/or pressure to the food product. In one aspect, the second arm may include a chassis adapted to hold the imprint head, and a stand for holding the heating source for heating said imprint head by supplying heat energy.

According to an embodiment of the invention, the heating source is either attached to, or incorporated within, the heat imprinting unit.

According to an embodiment of the invention, the heating source is a burner.

According to an embodiment of the invention, the manipulator is controlled by an electro-mechanical unit for automatically applying the necessary heat and/or pressure to the food product.

According to an embodiment of the invention, the food imprinting device further comprises a handle to allow operating the device repeatedly. In one aspect, the handle is adapted to be operated manually. In another aspect, the handle is adapted to be operated electromechanically.

According to one embodiment of the invention, the food product is applied to the heatable imprint head. According to other embodiments of the invention, the manipulator applies the heatable imprint head to the food product.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

FIGS. 9A-9D illustrate an exemplary embodiment of an imprint block mounting plate, according to some embodiments of the invention;

DETAILED DESCRIPTION

Disclosed are a system and method for imprinting of an image onto the surface of food items. In some embodiments, the present system is capable of producing substantially consistent imprinting results regardless of normal height, shape and/or size variations, and/or surface unevenness in the food products.

Reference will now be made to several embodiments of the present invention, examples of which are illustrated in the accompanying figures. Wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

The present invention is a heat pressing device that imprints (i.e., sears) a design or graphic on a variety of food products, such as a flat bread or pitta (i.e., a round Middle Eastern pocket bread), with the application of heat and pressure for a specific period of time (e.g., less than 25 seconds). Although the device is primarily intended for use in commercial and industrial locations, usage is not limited to such applications. The device may also be effectively used in residential settings as well as a variety of additional contexts.

Figure 1:
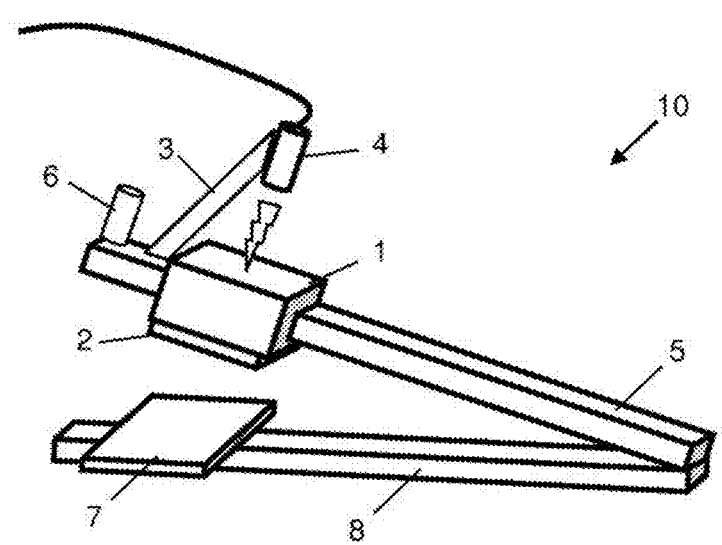
FIG. 1 schematically illustrates a heat pressing device for imprinting on a food product, according to some embodiments of the invention.

Specifically, as shown in FIG. 1, in an exemplary mode of production, a heat pressing food imprinting device 10 consists of two main assemblies an upper assembly and lower assembly. The upper assembly comprises an imprinting unit 1 adapted to hold a heatable plate 2 such as a metal template that is used as a "printhead" or a print applicator, and a heating source 4. In this exemplary configuration the imprinting unit 1 and the heating source 4 are mounted on an upper arm 5, wherein the heating source 4 is mounted to arm 5 via a supporting stand 3. In this embodiment, the arm 5 is provided with a handle 6 that is of sufficient size and configuration to allow a user to comfortably operate the device manually. According to another embodiment of the invention, the imprinting unit is adapted to be operated electromechanically (e.g., by an electro-mechanical unit) and/or by a computer system or a controller.

Importantly, the heating source 4 may be either attached to, or incorporated within, the assembly 5 depending upon manufacturer preference. In this exemplary configuration, the lower assembly comprises a tray 7 that is mounted to a lower arm 8.

In this exemplary embodiment, the heating source 4 is a mechanical device that burns a gas or liquid fuel into a flame in a controlled manner, such as a burner. Alternatively, the heating source 4 can be implemented by other heating generating techniques (e.g., electric heating) capable of heating the plate 2 such that it will be able to rapidly (e.g., a few seconds, preferably, less than 25 seconds) sear an image upon a food product while keeping the non-printing areas sear-free, and without damaging the original characteristics of the food product on its non-printing areas.

According one embodiment, imprinting unit 1 employs plate 2 to apply heat and pressure to the food product located on the tray 7 while keeping the non-printing areas sear-free and thereby undamaging the original food product characteristics. The heating source 4 (e.g., a burner) generates an energy (e.g., flame) that heats the plate 2 either directly or indirectly via a mediating element to which plate 2 is attached, such as a metal heat rod 9. For example, in this exemplary configuration, the upper assembly in the press opens like a clamshell structure that consist of two arms (e.g., upper arm 5 and lower arm 8) joined by a hinge area which allows the structure to come together to close.

Alternatively, in a "swing-away" design, the upper assembly swings away from the tray 7 or vice-versa. Plate 2 can be made of any heatable material(s) that is resistive to high temperatures (e.g., above 100 Celsius degrees such as metal alloys that have copper as their principal component). Other arrangements can also be used to apply heat and/or pressure and/or contact to the food product, such as a millstones-like arrangement (not shown) that includes two wheels, where at least one wheel is moveable and the other wheel can be stationary. For example, one wheel can be used as the lower assembly of device 10 and the other wheel can be used as the upper assembly of device 10. In this example, the lower assembly can be stationary, and above the lower assembly is a turning upper assembly (i.e., the other wheel that may turn in any direction) that includes the imprinting unit which does the searing. The turning upper assembly spins above the stationary lower assembly creating the searing action on food product located between the upper and lower assemblies. An arrangement for applying high-volume operations that involves continuous imprinting will be described in further details hereinafter with respect to FIG. 4.

According to an embodiment of the invention, the imprinting unit 1 that holds the plate 2 is located on the distal end of the upper assembly 5, in such a manner that plate 2 faces down towards tray 7. Tray 7 is located on the distal end of the lower assembly 8, such that plate 2 will be able to apply heat and pressure to a food product that is placed on tray 7 upon pressing the upper assembly 5 towards the lower assembly 8. Plate 2 is replaceable (i.e., detachable from the imprinting unit 1) and may comprise any of a variety of patterns reliefs, to provide significant versatility for industrial, commercial, or residential usage.

Figure 2:
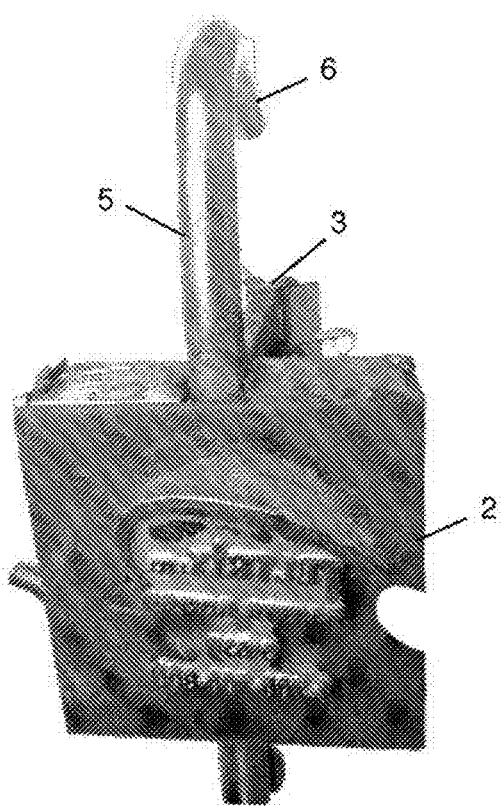
FIG. 2 schematically illustrates a bottom view of a metal template of attached to the device of FIG. 1, according to some embodiments of the invention.
Figure 3:
FIG. 3 shows two rounded flat breads imprinted with the metal template of FIG. 2 according to some embodiments of the invention.

FIG. 2 shows a bottom view of plate 2 attached to the upper assembly. In this figure, plate 2 is provided with an exemplary relief of an image that can be used in conjunction with the invention. FIG. 3 shows two rounded flat breads imprinted with the image of plate 2 of FIG. 2.

As noted, plate 2 can be changed or replaced for printing different images. As such, different plates with variety of patterns may include snap-in arrangement (not shown), for allowing a simple replacement of one plate with another.

According to an embodiment of the invention, for high-volume operations involving the continuous imprinting of food products, automatic shuttle transfer presses or other conveyer arrangements can be used. The substrates to be imprinted are continuously loaded onto the tray 7 and shuttled under the imprinting unit 1, which then applies the necessary heat and/or pressure. The necessary heat and/or pressure can be applied automatically by an electro-mechanical control unit that is managed by a dedicated controller or computer system.

Figure 4:
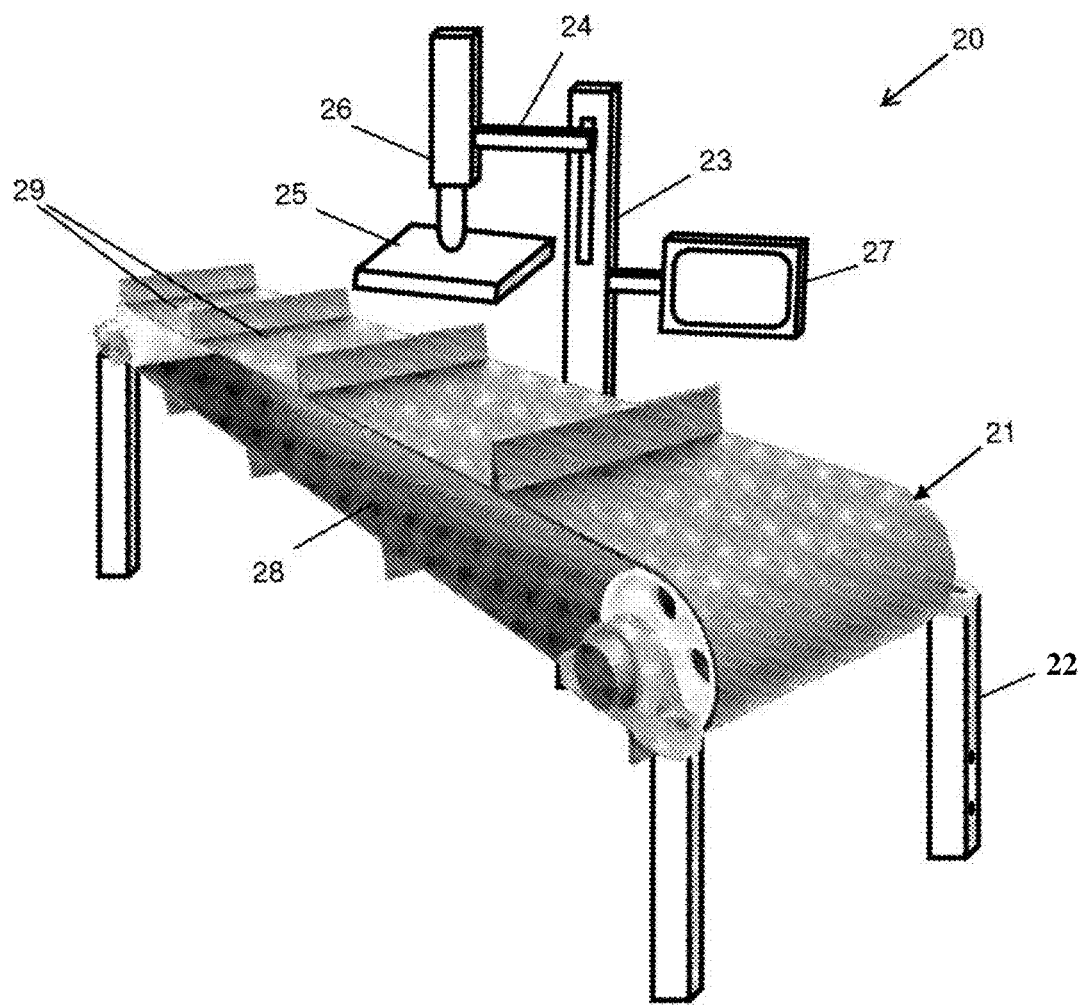
FIG. 4 schematically illustrates a device for high-volume operations involving the continuous imprinting on food products, according to some embodiments of the invention.

An example of an embodiment of a device for high-volume operations involving the continuous imprinting is shown in FIG. 4. In this embodiment, the device is embodied as a food imprinting workstation 20 that includes, a conveyor 21 which can be mounted on top of a base unit 22, a frame 23, an imprinting unit that include a manipulator 24 operatively mounted to frame 23 and a printhead 25 (e.g., a metal plate) connected to the manipulator 24, a heat source 26 for applying heat to the printhead 25 and a controller 27. Preferably, the imprinting workstation 20 is automated and computer-controlled for high-volume throughput processing of food products. The movements of the manipulator 24 which presses the printhead 25 on the food product can be actuated by any known means, such as linear actuators, pneumatic devices, push-pull systems, rack and pinion drives, and the like. According to some embodiments of the invention, the actuation of manipulator 24 is controlled by a computer system.

According to an embodiment of the invention, the gravitation can be used as the pressure source. In this embodiment, the food product can freely fall onto the heatable plate, such that the searing occurs without a direct pressure on the food product.

A foodstuff processing tray 28 having a plurality of compartments 29 is disposed on the conveyor 21 and holds a plurality of food products each in a separate compartment for pre-positioning the food products prior to imprinting the food product with printhead 25. The conveyor 21 is depicted as an endless belt that can be driven in one direction or in reversible directions for accurate pre-positioning. Tray 28 can be either a separate component freely supported on the conveyor 21 or an integrated component attached to or extending from the conveyor 21 in order to permit travel of the belt around the drive or driven rollers without interference. Tray 28 can be constructed from plastic, and each compartment 29 defines a suitable geometric shape (e.g., rectangular) for snugly holding individual food products therein. In some embodiments, the compartments 29 may also include a cavity shaped to correspond with the particular type of food product being printed upon (e.g., a rounded cavity for a round Pitta). Thus, the conveyor 21 can be filled with differently shaped food products in one or more of the compartments 29. Other materials, such as rubber, silicon, or combinations thereof can also be used to construct the tray 28. Harder materials, such as metal, and derivatives thereof, can also be used.

All of the above operations are preferably automated by the controller 27, which may be a microprocessor- or microcontroller-based device, such as a programmable logic controller, connected to appropriate sensors and servomechanisms. The controller 27 can also be programmed via a Human-Machine Interface (HMI), such as a touchscreen, to monitor the rate of processing, determine the information to be printed when using a dynamic plate, determine the type of food product being processed, set the necessary heat and/or pressure, the volume and weight of the food products being processed, etc. based upon user requirements and input.

Regarding the intended method of utilizing device 10, the user first has the imprinting unit 1 with proposed plate 2 installed. After the desired plate is installed, the heating source 4 is turned on and the plate 2 is pressed against the desired food product for searing. Such may be a single imprinting, or may alternatively be a series of separate movements to sear a repetitive pattern on the food products in question for high-volume operations that involves continuous imprinting.

Regarding manufacture of device 10, the modular components of the device may be injection molded, cast, molded, or machined from various materials. Such materials include, but are not limited to ferrous materials.

Importantly, regarding practicality of use of the device, it is also produced to withstand considerable heat. The heatable plate is also constructed to be highly durable in nature, particularly in light of its usage with direct heat source such as a flame that can reach above 100 Celsius degrees.

Moreover, the tray shapes of the device may vary significantly, to allow for additional versatility for the user. For the purposes of example only, such tray shapes may be anything from a rectangular (which may be used for flat bread) or circular (which may be used for a round shaped flat bread).

As will be appreciated by the skilled person the arrangement described in the figures results in a device for producing ornamental designs on a food product, in particular bread or flat bread and other baked dough products.

The terms, "for example", "e.g.", "optionally", as used herein, are intended to be used to introduce non-limiting examples. While certain references are made to certain example system components, other components can be used as well and/or the example components can be combined into fewer components and/or divided into further components.

All the above description and examples have been given for the purpose of illustration and are not intended to limit, the invention in any way. Many different mechanisms and heating elements can be employed, all without exceeding the scope of the invention. The present system may be used with a variety of food products, although it is particularly suitable for use with dough-based food products and/or baked goods, e.g., breads, rolls, buns, bagels, pita bread, and the like. In some embodiments, the present system is primarily intended for high volume applications, such as in commercial bakeries. However, in other embodiments, the present system may be adapted for processing individual and/or small batches of food products, e.g., in the context of restaurants, hotels, food stores, and food concession stands. In yet other embodiments, variations of the present systems may be adapted for individual home use and/or with respect to non-food products.

Food imprinting, and specifically, baked goods imprinting, is typically carried out by the application of a heated imprinting element to the surface of the food, under pressure and for a specified period of time. Natural variations in the height, shape, size, and/or surface contours in food products—even those of the same kind or from the same batch—may result in inconsistent imprint results, and potentially also in damage to the products. For example, in the case of buns, when a heated imprinting element is being applied under pressure to the surface of the bun, any surface unevenness may cause certain areas to come into contact with the imprinting element sooner and for a longer duration, and thus be subject to greater pressure and prolonged heat exposure. In certain cases, this may lead to a partially burnt appearance, acrid smell, unpleasant taste, poor image transfer, and/or damage to the product through the puncturing of its outer crust. This issue is particularly significant in a production line environments, where frequent equipment adjustments are impracticable.

Accordingly, a potential advantage of the present system is, therefore, in that it is configured for automatically self-adjusting and/or creating a level imprinting surface, so as to accommodate food items having, e.g., normal size, height, and/or shape variations, and/or surface unevenness, without the need for manual intervention and/or adjustments.

Figure 5A:
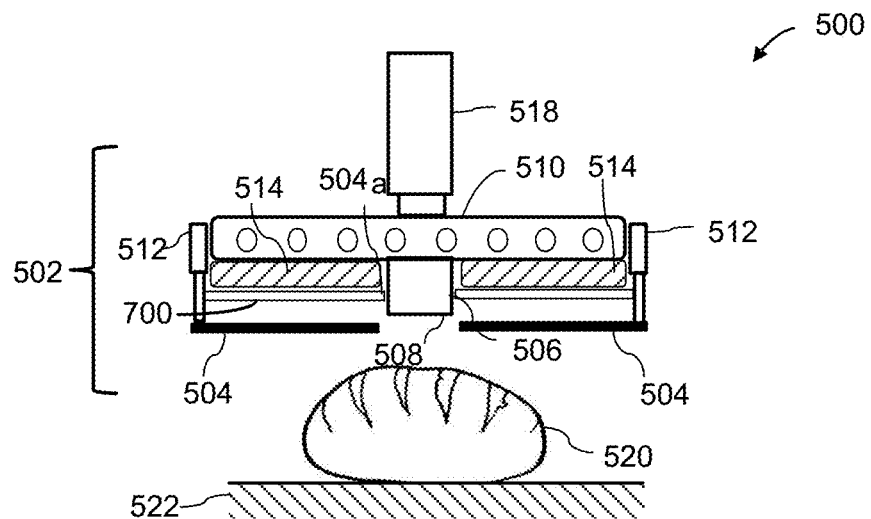
FIGS. 5A-5C schematically illustrate a food imprinting system, according to some embodiments.
Figure 5B:
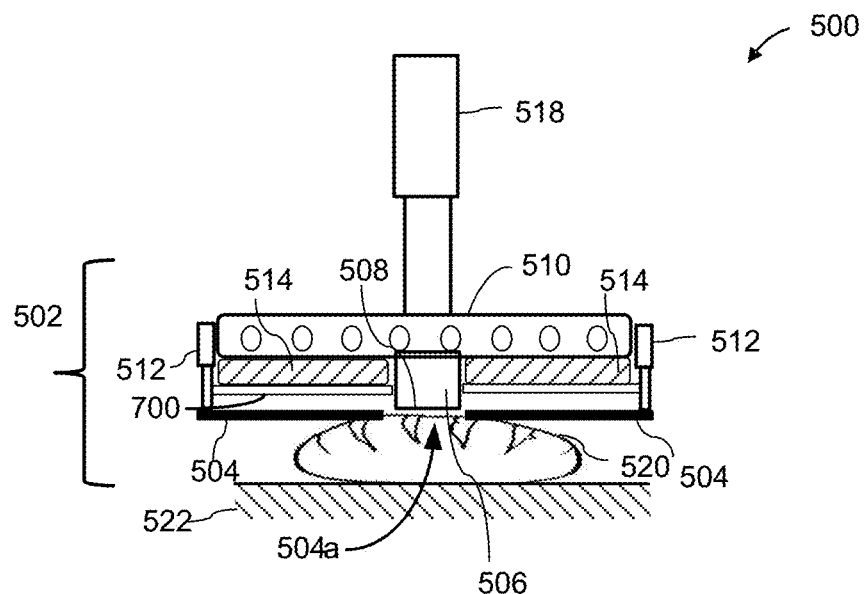
Figure 5C:
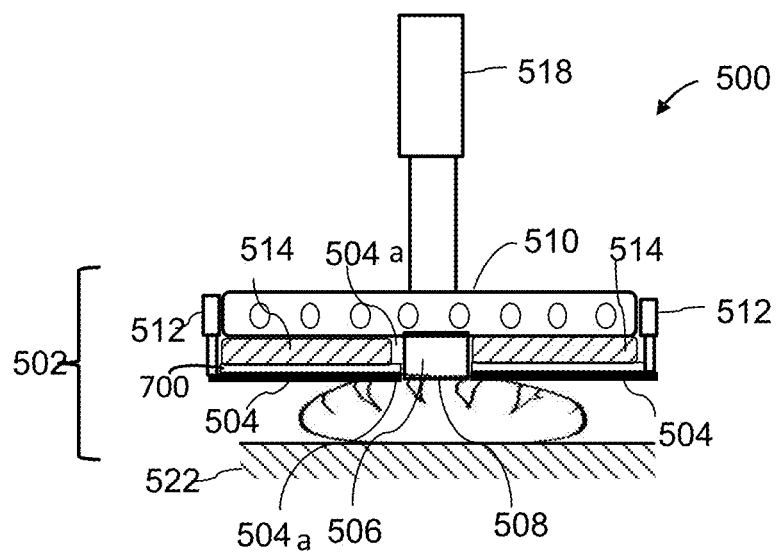

FIGS. 5A-5C schematically illustrate an exemplary food imprinting system 500, according to some embodiments. System 500 may perform the imprinting of food items through the application of a heatable imprint block 506 to the surface of a food item 520. Food item 520 may be a typical dough-based product which has a certain amount of give and is relatively springy and/or elastic, and thus capable of sustaining a temporary application of a compressive pressure and at least partially regain its original shape once the pressure ceases.

Figure 5D:
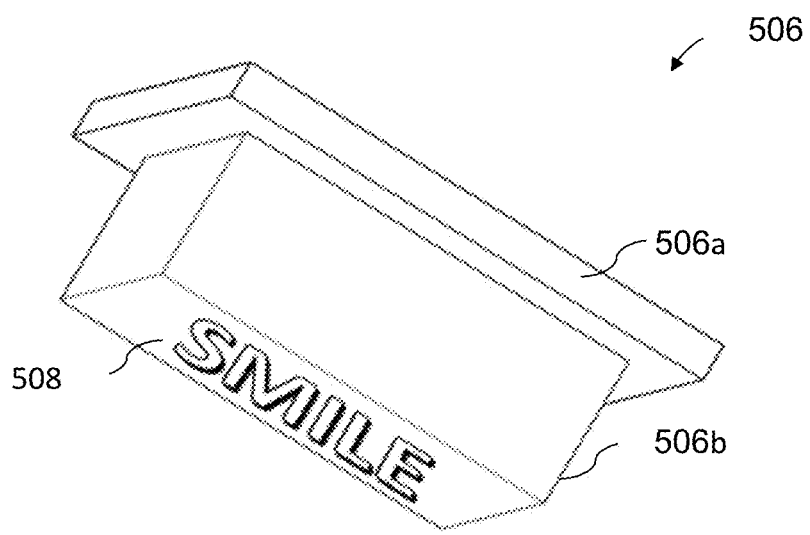
FIG. 5D schematically illustrates an exemplary imprint block, according to some embodiments of the invention.

With reference to FIG. 5D, in some embodiments, the application of imprint block 506 to the surface of food item 520 will typically be carried out with imprint block 506 being pre-heated to a specified temperature, which may be between 200° and 600° C. Imprint block 506 may then be configured for applying a specified amount of pressure to the surface of food item 520 for a specified duration, so as to produce desirable image transfer results without damaging food item 520. The combination of heat and pressure may cause imprint block 506 effect a searing the surface of food item 520 in the shape of a pattern relief on an imprinting face 508 of imprint block 506.

With continued reference to FIG. 5D, in some embodiments, imprinting face 508 may comprise any of a variety of pattern reliefs, including textual and/or graphic elements. In some embodiments, imprint block 506 may be made of any suitable metal and/or metal alloy configured to withstand operating temperatures of up to 600° C., and to provide a food-safe contacting surface. In some embodiments, imprinting face 508 may be wholly or partially coated in, e.g., a food-safe coating, a nonstick coating, and/or a release agent. In some embodiments, imprint block 506 as a whole, or imprinting face 508 alone, may be changeable, so as to be changed or replaced for imprinting different images. As such, different imprint blocks 506 and/or imprinting faces 508, with a variety of pattern reliefs, may include, e.g., a snap-in and/or drop-in arrangement (which will be further described below) for allowing a quick and simple replacement.

With reference back to FIGS. 5A-5C, in some embodiments, imprint block 506 is part of an imprinting assembly 502 which further includes a release plate 504, a heat source 510, and an insulation layer 514 located between release plate 504 and heat source 510. Imprint block 506 may be mounted within imprinting assembly 502 using a mounting plate (not shown) similar to that described with reference to FIGS. 7D-7E and 9A-9D.

In some embodiments, imprinting assembly 502 is mounted to a imprinting assembly driver 518, and is configured for moving in, e.g., the vertical dimension, towards and away from food item 520 placed on support base 522. However, in other variations, imprinting assembly driver 518 may be configured for moving support table 804 towards and away from imprinting assembly 502.

In some embodiments, release plate 504 comprises at least one opening 504a configured for receiving therethrough at least a forward portion of imprint block 506, such that a forward face of release plate 504 forms a peripheral shoulder around the portion of imprint block 506 extending through opening 504a. In some embodiments, opening 504a is dimensioned such that a small air gap is created surrounding imprint block 506, so as to prevent imprint block 506 from transferring heat energy to release plate 504.

In some embodiments, release plate 504 is mounted within imprinting assembly 502 through extendable mounts 512, which may be configured for allowing release plate 504 to move substantially freely in the vertical dimension relative to imprint block 506, within a specified range of motion. In some embodiments, release plate 504 may be permitted to be freely suspended from mounts 512, e.g., under the influence of gravity. In some embodiments, a location of release plate 504 relative to imprint block 506 may change during various stages of the imprinting process, via, e.g., the influence of gravity and/or any counterforces exerted by food item 520. For example, as can be seen in FIG. 5A, in its initial position, the weight of release plate 504 may cause extendable mounts 512 to be substantially fully extended, such that release plate 504 is suspended at its lowest position relative to imprint block 506, with imprint block 506 being fully retracted into opening 504a.

The release plate is configured to weigh down food items (e.g., bread rolls, pita bread) being imprinted and average out the height of the of the items so that to effect a uniform imprint on the food items being imprinted. The release plate comprises holes that allow the imprinting blocks to engage the food items being imprinted through the release plate. In some embodiments, the release plate prevents food items being imprinted from sticking to the imprinting blocks or rising upwards when the imprinting blocks disengage the food items.

In some variations, extendable mounts 512 may be, e.g., telescopic or similar mounts. In some embodiments, telescopic extendable mounts 512 may be moved between (i) a locked state, in which release plate 504 is locked in a fixed position relative to imprint block 506, and (ii) an unlocked state, in which planar plate 502 is permitted to move substantially freely in the vertical dimension, within a specified range of motion. In other embodiments, release plate 504 may be suspended from imprinting assembly 502 using, e.g., one or more flexible cables, wires, or chains. In other variations, extendable mounts 512 may incorporate, e.g., a resilient element, such as a coil spring, an air spring, a gas spring, or an elastomeric spring. In yet further variations, extendable mounts 512 may comprise an actuator, such as linear actuators, pneumatic systems, push-pull systems, rack and pinion drives, and the like.

In some embodiments, release plate 504 may be made of any suitable metal, metal alloy, a ceramic material, or any other suitable material configured for withstanding operating temperatures of up to 600° C. In some embodiments, release plate 504 has a thickness of at least 2 mm. In some embodiments, release plate 504 and/or a forward face of release plate 504 may be configured for providing a food-safe contacting surface. Alternatively, the forward face may comprise a food-safe surface coating. Optionally, the forward face may be configured to provide a nonstick surface.

In some embodiments, heat source 510 is operatively coupled to heatable imprint block 506, and is configured for heating imprint block 506 to a specified temperature. In some embodiments, heat source 510 is an adjustable heat source configured for heating imprint block 506 within a range of specified temperatures, depending on the specific types of food being imprinted. In some embodiments, the specified range of temperatures is between 200° and 600° C. Heat source 510 may be either attached to, or incorporated within, imprint block 506, and may be configured to heat imprint block 506 either directly or indirectly, via a mediating element.

In some embodiments, heat source 510 may be configured for regulating the temperature of imprint block 506 so as to maintain an optimal operating temperature of imprinting face 508, which, in some embodiments, is equal to 580° C. As will be understood by those skilled in the art, during successive cycles of imprinting, the operating temperature of imprint block 506 may decrease after each imprinting cycle through heat transfer to the food item. Conversely, during the initial heating of imprint block 506, when it is not under load, there is a risk of overheating, which may result in suboptimal imprinting during one or more initial imprinting cycles. Accordingly, in some embodiments, heat source 510 may be configured for heating imprint block 506 to a lower initial temperature, which will not cause damage to food item 520 during the first one or several imprinting cycles. Subsequently, during quick successive imprinting cycles, heat source 510 may be configured for supplying imprint block 506 with a heat energy pulse between cycles, so as to quickly increase its temperature back to the optimal operating temperature. In some embodiments, heat source may be configured for determining the correct amount of heat energy to be supplied to imprint block 506 during each stage of the operation based, e.g., on one or more temperature sensors configured for measuring an operating temperature of imprinting face 508, directly or indirectly.

In some embodiments, insulation layer 514 is made of a material having low thermal conductivity properties. Insulation layer 514 may be configured for filling spaces between release plate 504 and heat source 510, so as to substantially prevent the transfer of heat energy between heat source 510 and release plate 504. Thus, release plate 504 may be prevented from potentially scorching or otherwise leaving undesirable marks on the food products being imprinted. In some embodiments, insulation layer 514 has resilient properties, such that it may provide a certain amount of resiliency and 'give' to elements within imprinting assembly 502, including release plate 504 and/or imprint block 506.

The working principles of system 500 will be explained with continued reference to FIGS. 5A-5C. In some embodiments, as can be seen in FIG. 5A, at the beginning of an imprinting process, food item 520 may be placed on support base 522. Heat source 510 may then be configured for heating imprint block 506 up to an initial operating temperature Once imprint block 506 has reached initial operating temperature, imprinting assembly driver 518 may be configured for moving imprinting assembly 502 downwardly, towards food item 520. In some embodiments, as noted above, at this stage, the weight of release plate 504 may cause it to be suspended at its most downward position relative to imprint block 506, such that extendable mounts 512 are fully extended. As imprinting assembly 502 is being moved downwardly closer to food item 520, as can be seen in FIG. 5B, release plate 504 makes first contact with food item 520. The weight of release plate 502 may cause an initial compression of food item 520, until food item 520 may reach a certain density level and begins to resist further compression. At that point, release plate 504 may come to rest atop food item 520. The at least partially compressed food item 520 may create at that stage a more consistent and stable imprinting surface. In certain embodiments further detailed below, where an imprinting system of the present disclosure may be configured for simultaneous imprinting of multiple food items, release plate 504 may be configured for leveling height inconsistencies among the plurality of food items, so as to create a relatively level and consistent imprinting surface.

In some variations, certain parameters of release plate 504 and/or extendable mount 512 may be operator-adjusted. For example, the range of vertical travel of release plate 504 within imprinting assembly 502 may be extended or decreased. In some variations, system 500 may comprise one or more sensor elements configured to detect one or more relevant dimensional parameters with respect to food item 520, and to adjust a position of release plate 504 accordingly. In other cases, release plate 504 may be an exchangeable release plate, such that various release plates 504, e.g., having different thicknesses and/or weight characteristics, may be used. These parameters may be selected based, e.g., on the specific shape, dimensions, and/or type of the food item being imprinted. In some variations, extendable mounts 512 may incorporate, e.g., a resilient element, to provide a greater effective compressive force. In other variations, extendable mounts 512 may be adjustable using, e.g., suitable actuators.

In some embodiments, as can be seen in FIG. 5C, once the initial compression of food item 520 has been achieved, imprinting assembly 502 then continues to be moved downwardly towards food item 520, until imprint block 506 extends a specified distance through opening 504a. Imprint block 506 thus makes contact for a specified duration with a portion of food item 520 exposed through opening 504a, to effect the imprinting of food item 520. In some embodiments, imprinting assembly 502 may be further configured for being moved a predetermined distance beyond the initial surface contact of imprint block 506 with food item 520, such that imprint block 506 applies a specified amount of force to the top surface of food item 520. In some embodiments, such predetermined distance may be operator-adjustable, based, e.g., on the specific shape, dimensions, and/or type of the food item being imprinted.

Once the imprinting is completed, imprinting assembly driver 518 may then be configured for moving imprinting assembly 502 upwards and away from food item 520. As noted above, extendable mounts 512 may be configured for allowing release plate 504 to move freely or partially-freely relative to imprint block 506, e.g., under gravity. Accordingly, as imprinting assembly 502 is being moved upwards, imprint block 506 may be retracted back through opening 504a, while extendable mounts 512 are being extended and release plate 504 remains temporarily in its resting position atop food item 520. Once extendable mounts 512 have reached a fully extended state, release plate 504 begins to move upwards with imprinting assembly 502. Thus, in cases where food item 520 may be clinging to heated imprinting face 508, release plate 504 may effect the release of food item 520 by the retraction of imprint block 506 back through opening 504a. Following the complete retraction of imprinting assembly 502, the imprinting process is complete and food item 520 may substantially reassume its original shape.

Figure 6B:
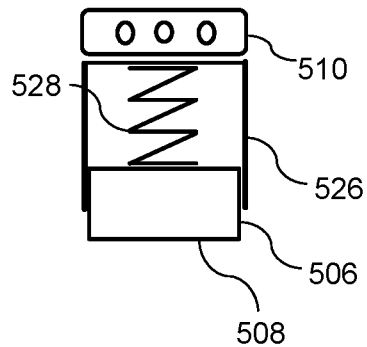
FIGS. 6A-6E schematically illustrate certain embodiments of a movable imprint block, according to some embodiments of the invention.
Figure 6A:
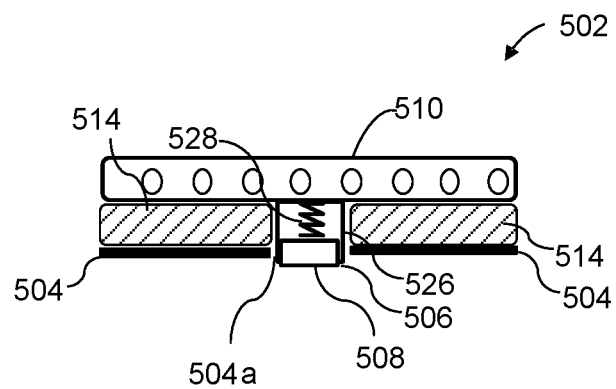

FIGS. 6A-6E illustrate several exemplary embodiments in which imprint block 506 may be configured for limited movement in the vertical direction, alone or in combination with release plate 504. FIG. 6A illustrates an exemplary system 502 wherein imprint block 506 is configured for being movable relative to release plate 504. FIG. 6B illustrates, in enlarged detail, an exemplary movable imprint block assembly, wherein imprint block 506 may be mounted, e.g., as a telescopic element within mounting base 526, wherein the movement of imprint block 506 may be controlled by a resilient member 528, such as a coil spring, an air spring, a gas spring, an elastomeric spring, and/or a system of counterweights. The resilient member may be configured for providing a specified amount of resisting force to the dislocation of imprint block 506 into mounting base 526. Accordingly, during the imprinting process, the additional resiliency introduced between release plate 504 and imprint block 506 through resilient member 528 may be further configured for accommodating more significant dimension, shape, and/or surface variations in the food item begin imprinted.

Figure 6C:
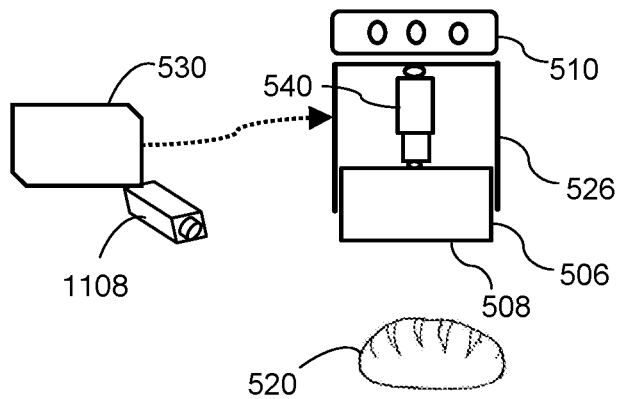

With reference to FIG. 6C, in a variation, resilient member 528 may be replaced with an actuator 540 coupled to imprint block 506 and controlling its movements relative to release plate 504. Actuator 540 may be controlled by controller 530. Actuator may be any suitable actuator, such as a linear actuator, a pneumatic piston, a push-pull system, a rack and pinion drive, and the like. Controller 530 may further comprise one or more sensor elements configured to detect one or more relevant dimensional parameters with respect to food item 520, and to adjust a position of imprint block 506 relative to release plate 504, through operating actuator 540.

Figure 6E:
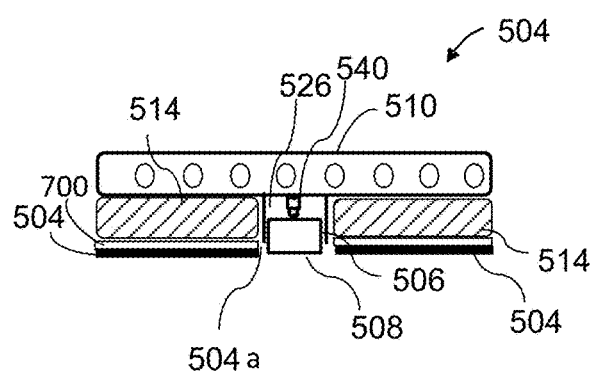
Figure 6D:
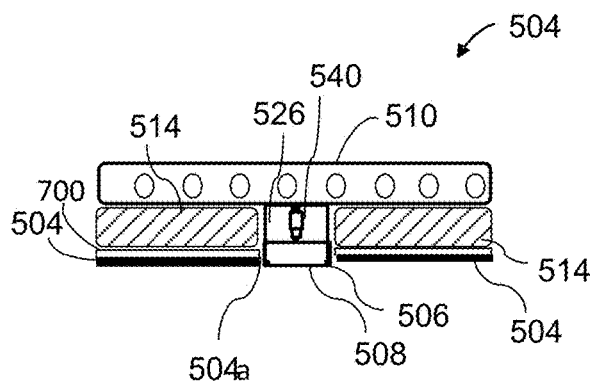

With reference to FIGS. 6D-6E, in some embodiments, a system 504 may incorporate an actuator 540 configured for adjusting a positioning of imprint block 506 relative to release plate 504 during various stages of the imprinting process. For example, as described above with reference to FIGS. 5A-5C, system 504 may be configured for lowering imprinting assembly 502 towards the food item being imprinted, with imprint block 506 in a retracted position relative to release plate 504, so that release plate 504 may first create a relatively level and uniform imprinting surface. Actuator 540 may then be configured for advancing imprint block 506 through opening 504a, so as to make contact with and imprint the food item. Following the imprinting, actuator 540 may be then configured for retracting imprint block 506 at least partially through opening 504a, as can be seen in FIG. 6E. Thus, as imprint block 506 is being retracted back through opening 504a, any food item which may be clinging to heated imprinting face 508, may be released by the retraction of imprint block 506 relative to release plate 504.

Figure 7A:
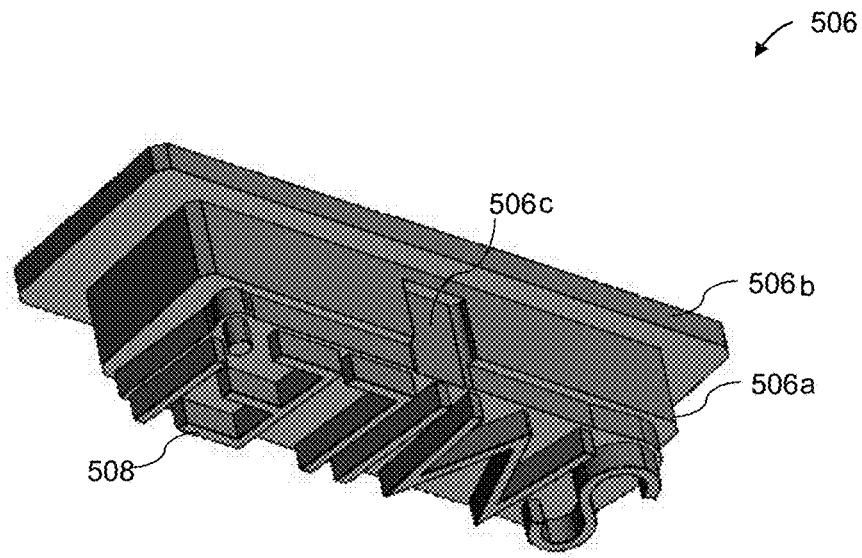
FIGS. 7A-7F illustrate an exemplary mounting for an imprint block, according to some embodiments of the invention.
Figure 7B:
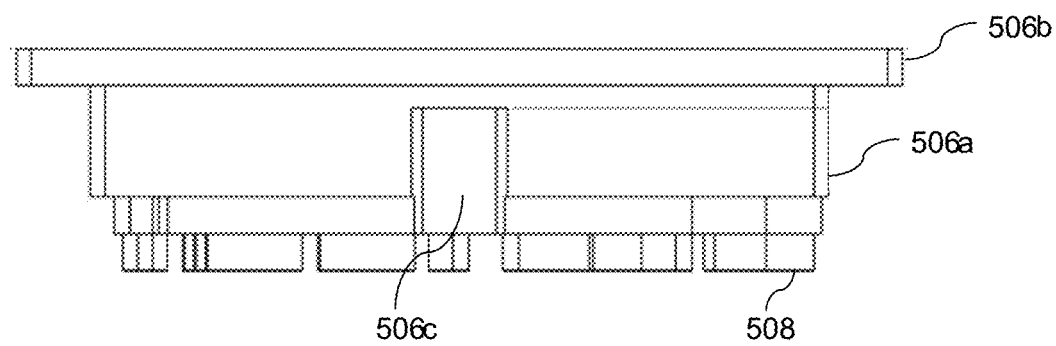
Figure 7C:
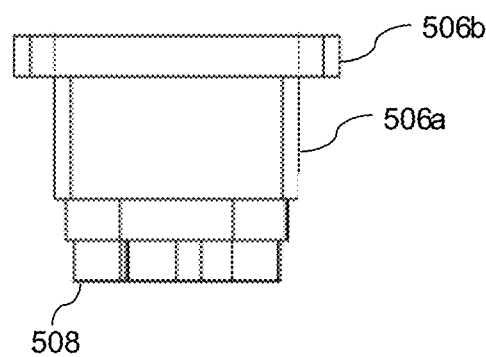

FIGS. 7A-7C illustrate, respectively, perspective and side views of an exemplary imprint block 506. Imprint block 506 comprises a body 506a, a shoulder 506b extending outwardly relative to body 506a, and an imprint face 508 comprising a pattern relief. In some embodiments, imprint block 506 may further comprise one or more recesses 506c along sides of body 506a.

Figure 7D:
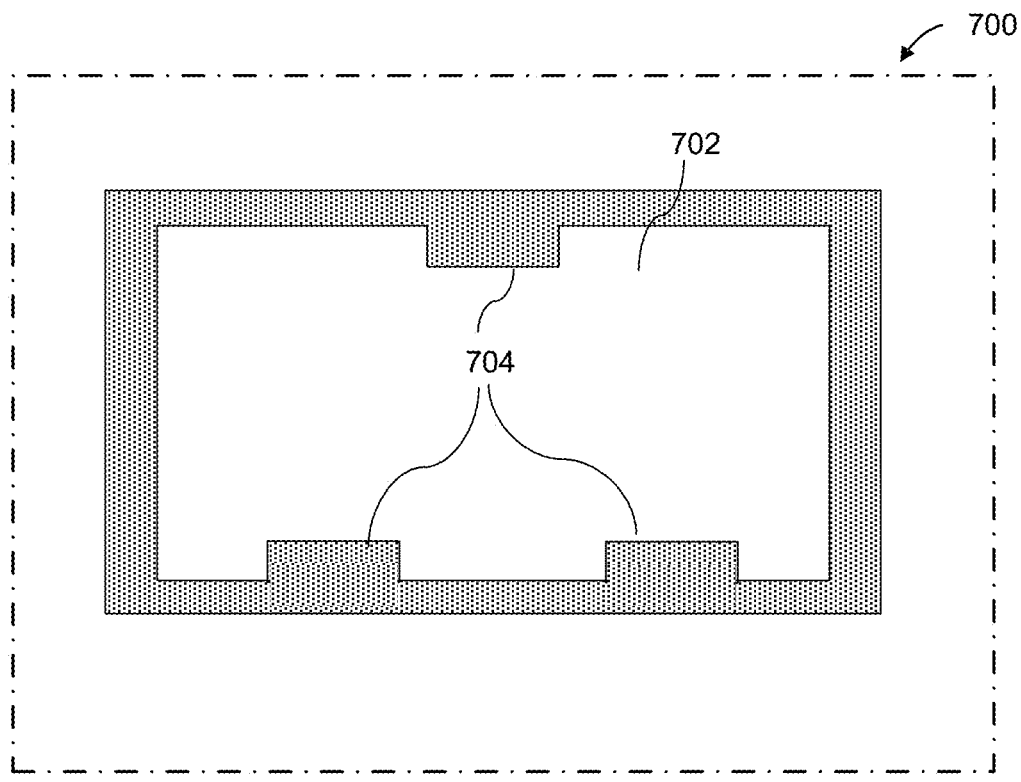
Figure 7E:
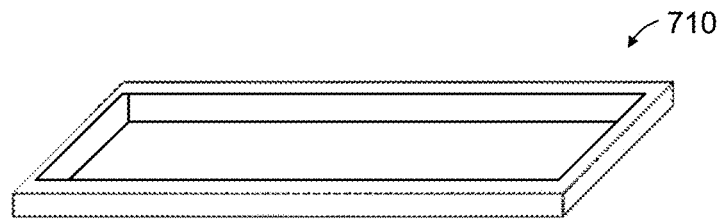

FIGS. 7D-7E illustrate, respectively, a mounting plate 700 and ring-type support 710, configured for mounting imprint block 506 within an imprinting assembly, such as imprinting assembly 502 of FIGS. 5A-5C. As shall be detailed below, in some embodiments, mounting plate 700 and ring support 710 comprise a plurality of design features configured for minimizing the transfer of heat from imprint block 506 to mounting plate 700.

In some embodiments, mounting plate 700 comprises a planar plate having an opening 702 dimensioned for receiving at least a forward portion of imprint block 506, such as body 506a. In some embodiments, opening 702 is dimensioned such that an air gap at least between 0.1 and 5 mm remains around body 506a when it is received through opening 702. Such air gap may be configured for preventing the transfer of heat energy from imprint block 506 to mounting plate 700. Support 710 may be a ring-type support rim, dimensioned for receiving body 506a of imprint block 506 therethrough, but to prevent passage of shoulder 506b. Support 710 may be further dimensioned so as to create an air gap surrounding body 506a, which air gap may be at least between 0.5 and 5 mm. In some embodiments, support 710 has a rim height of at least between 3 and 10 mm, and a rim width of at least 2 mm. In some embodiments, the width of the rim is less than 2 mm in cases in which a material from which the rim is made is strong enough to support the weight of imprint block 506 and withstand high temperatures as described elsewhere herein. Mounting plate 700 and support 710 may be made of any suitable metal and/or metal alloy configured to withstand operating temperatures of up to 600° C. In some embodiments, support 710 may be integrally formed with mounting plate 700. In some embodiments, one or more protrusions 704 in opening 702 correspond to one or more recesses 506c in imprint block 506.

Figure 7F:
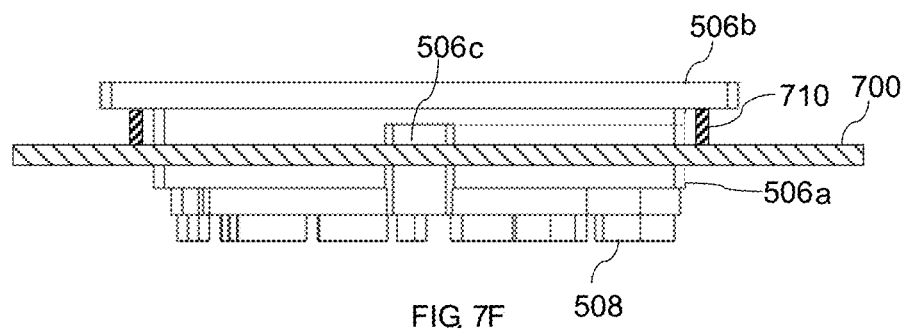

FIG. 7F illustrates the manner in which imprint block 506 may be mounted using mounting plate 700 and support 710. In some embodiments, imprint block 506 may be drop-in mounted through opening 702, without being attached to mounting plate 700. In some embodiments, support 710 is configured for being located between shoulder 506b and mounting plate 700, so as to minimize the contact area between imprint block 506 and mounting plate 700. This in turn further prevents the transfer of any heat energy from imprint block 506 into mounting plate 700. Because imprint block 506 is drop-in mounted without being attached to mounting plate 700 and/or support 710, in some embodiments, protrusions 704 in opening 702 and corresponding recesses 506c work together to facilitate to correct positioning of imprint block 506 within opening 702.

Figure 8A:
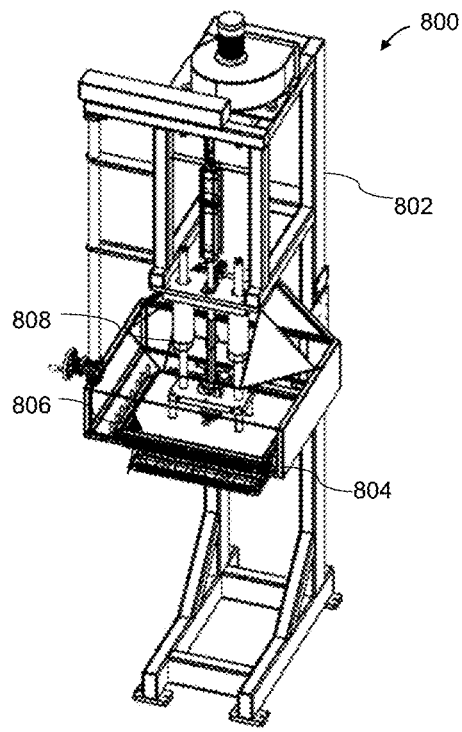
FIGS. 8A-8B illustrate an exemplary food imprinting station, according to some embodiments of the invention.
Figure 8B:
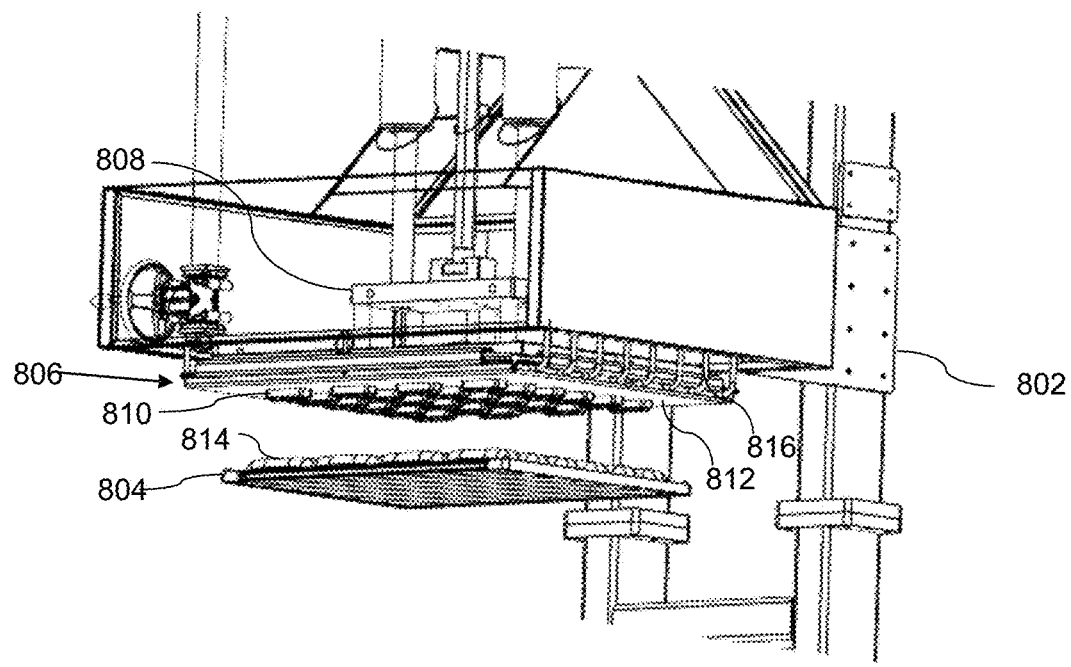

FIG. 8A illustrates an exemplary imprinting station 800 configured for high-volume production applications. FIG. 8B illustrates an enlarged detail of station 800. In high volume applications, the present system may be configured for simultaneous imprinting of multiple food items, e.g., by employing an imprint block array comprising a plurality of imprint blocks, and configured for simultaneously imprinting a like number of food items similarly arranged, e.g., in a tray. In other variations, station 800 may be configured for being incorporated within a conveyor-based production line. In such applications, food items for imprinting may be continuously conveyed, individually or in batches, through imprinting station 800.

Accordingly, in some embodiments, imprinting station 800 may comprise one or more of:

A support structure, such as a frame or turret 802;
a support table 804 for receiving, e.g., trays containing one or more food products arranged, for example, in rows and columns. In a variation, support table 804 may be configured for being incorporated into a continuous production line;
a movable imprinting assembly 806 comprising one or more heatable imprint blocks 810 connected to a heat source 816, a release plate 812 comprising a plurality of opening similar to opening 504a in FIGS. 5A-5C, and an insulation layer disposed between heat source 816 and release plate 812; and
a imprinting assembly driver 808 configured for moving imprinting assembly 806 in the vertical dimension towards and away from support table 804.

With continued reference to FIGS. 8A-8B, an imprinting process involving station 800 may be substantially similar to the working principles described above with reference to FIGS. 5A-5C. For example, in some embodiments, an imprinting cycle may begin by introducing a tray of one or more food items, such as breads or similar baked items 814, at support table 804. In some variations, individual food items 814, or batches of food items 814, may be conveyed through station 800 as part of a continuous production line arrangement. Heat source 816 may then be configured for heating imprint blocks 810 up to initial operating temperature. Once imprint blocks 810 have reached operating temperature, imprinting assembly driver 808 may be configured for moving imprinting assembly 806 downwardly, towards food items 814. However, in some embodiments, imprinting assembly driver 808 may be configured for moving support table 804 upwardly, towards imprinting assembly 806.

In some embodiments, as noted above, at this stage, the weight of release plate 812 may cause it to be suspended at its most downward position relative to imprint blocks 810, such that, e.g., extendable mounts holding release plate 812 are fully extended. As imprinting assembly 806 is being moved downwardly closer to food items 814, release plate 812 makes first contact with food items 814. The weight of release plate 812 may cause an initial compression of food items 814, until food items 814 may reach a certain density level and begin to resist further compression. At that point, release plate 812 may come to rest atop food items 814. By compressing food items 814, release plate 812 may be configured for leveling height inconsistencies among the plurality of food items 814, so as to create a relatively level and consistent imprinting surface.

In some embodiments, once the initial compression of food items 814 has been achieved, imprinting assembly 806 then continues to be moved downwardly towards food items 814, until imprint blocks 810 extend a specified distance through the corresponding openings in release plate 812. Each of imprint blocks 810 thus makes contact for a specified duration with a portion of a corresponding food item 814 exposed through an opening, to effect the imprinting of food items 814.

Once the imprinting is completed, imprinting assembly driver 808 may then be configured for moving imprinting assembly 806 upwards and away from food items 814. As noted above, extendable mounts holding release plate 812 may be configured for allowing release plate 810 to move freely or partially-freely relative to imprint blocks 810, e.g., under gravity. Accordingly, as imprinting assembly 806 is being moved upwards, imprint blocks 810 may be retracted back through the corresponding openings in release plate 812, while the extendable mounts holding release plate 812 are extended and release plate 812 remains temporarily in its resting position atop food items 814. Once the extendable mounts have reached a fully extended state, release plate 812 begins to move upwards with imprinting assembly 806. Thus, in cases where one or more of food items 814 may be clinging to imprint blocks 810, release plate 812 may affect the release of food items 814 by the retraction of imprint blocks 810 back through the openings in release plate 812.

Figure 9A:
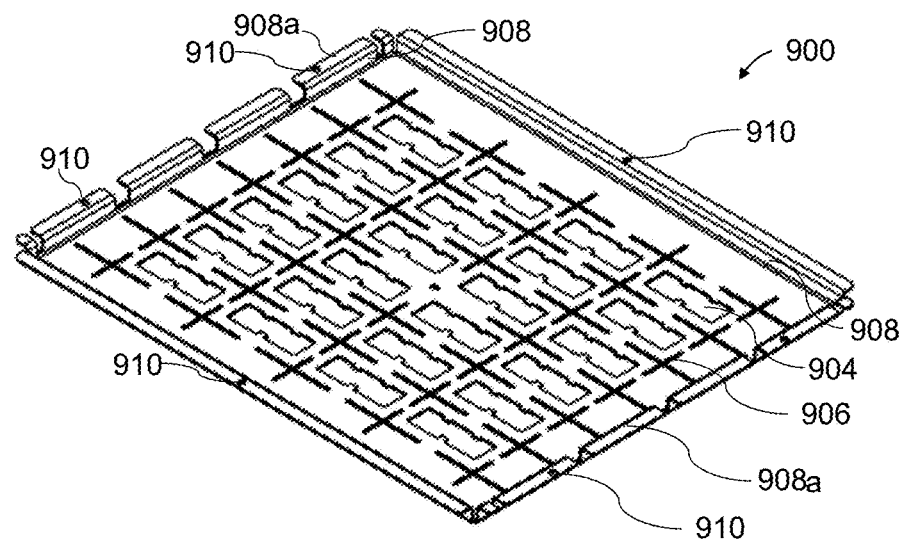

FIGS. 9A-9C illustrate an exemplary mounting plate 900, which is similar to mounting plate 700 in FIG. 7A, but is configured for mounting a plurality of imprint blocks. Mounting plate 900 may be configured for use in a high volume arrangement comprising a plurality of imprint blocks, such as with respect to station 800 in FIGS. 8A-8B. In some embodiments, mounting plate 900 may be configured for increased resistance to heat-induced warping, which may be caused by the relatively high operating temperature of the plurality of imprint blocks mounted within. Accordingly, mounting plate 900 may comprise a plurality of design features configured for minimizing the transfer of heat from the imprint blocks to mounting plate 900. As shall be further detailed below, in some embodiments, mounting plate 900 may be further configured for a quick exchange of a loaded mounting plate 900 within an imprinting station during operation, without requiring a cooling off period with respect to the plurality of imprint blocks mounted within.

FIGS. 9A-9C illustrate, respectively, perspective, side, and top views of mounting plate 900 configured for minimizing heat transfer as well as increasing dimensional stability and resistance to heat-related warping. In some embodiments, mounting plate 900 is made of a sheet of metal or metal alloy having a thickness of at least 2 mm. In some embodiments, mounting plate 900 comprises a plurality of openings 904 configured for receiving therethrough a corresponding plurality of imprint blocks, similar to opening 702 in FIG. 7D. Openings 904 each also includes a plurality of protrusions 704, similarly to protrusions 704 in FIG. 7D. In some embodiments, the size of protrusions 704 may be configured for minimizing heat transfer from imprint blocks 506.

Mounting plate 900 may comprise a plurality of generally elongated slots 906, distributed substantially evenly about a planar surface of mounting plate 900. Slots 906 may be arranged in the shape of crosses or a similar design, and may be created through, e.g., stamping, laser cutting, water cutting, etc. In some embodiments, slots 906 may each have a length of between 50 and 150 mm, and a width of between 1 and 15 mm, 2 and 10 mm or 3 and 6 mm. Slots 906 may be spaced between 100 and 200 mm center-to-center. In some embodiments, slots 906 may be configured for preventing warping of mounting plate 900 due to temperature differentials in various regions of mounting plate 900. For example, slots 906 may permit various regions of mounting plate 900 to expand and contract independently in response to heating, thus minimizing overall potential heat-induced warping. Mounting plate 900 may further comprise a mounting hole 910 located centrally within mounting plate 900.

Figure 9D:
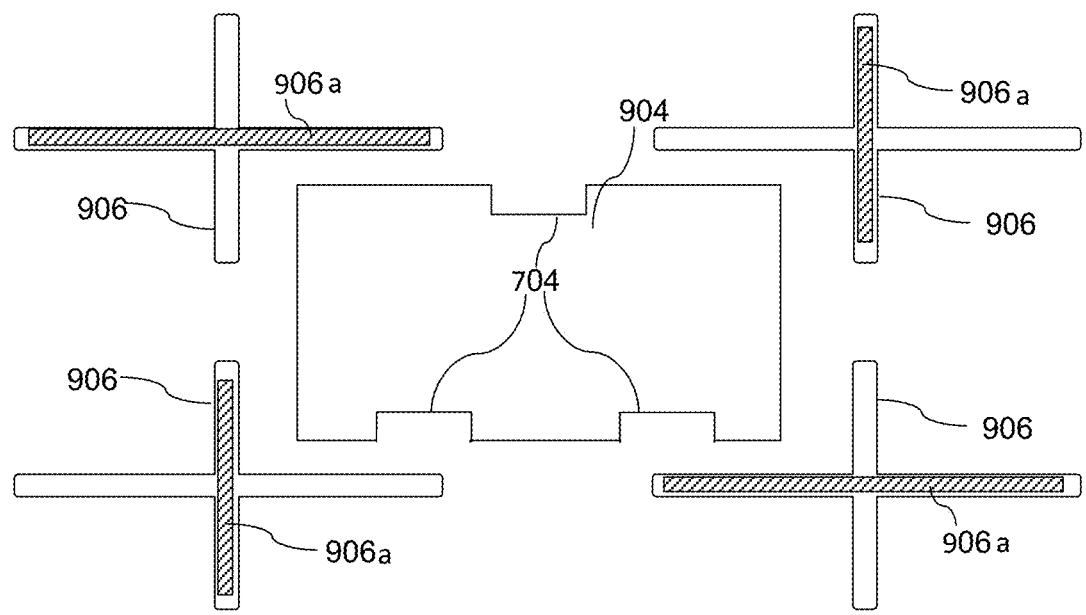

FIG. 9D is an enlarged detail of mounting plate 900 comprising an opening 904 surrounded by cross-shaped slots 906. In some embodiments, certain of slots 906 may each comprise a rod 906a welded within slot 906. In some embodiments, rods 906a may be of the same metal or metal alloy of mounting plate 900. In other variations, rods 906a may comprise a different metal or metal alloy, having a different coefficient of thermal expansion. For example, rods 906a may have a coefficient of thermal expansion which is lower than that of mounting plate 900 as a whole. Thus, when located within a first arm of a cross-shaped slot 906, as shown in FIG. 9D, rods 906a may be configured for limiting heat-induced expansion only in the dimension of said first arm. Accordingly, a particular distribution of rods 906a among slots 906 may further provide for desirable expansion and contraction characteristics in various regions of mounting plate 900, so as to further minimize overall heat-induced warping.

In some embodiments, mounting plate 900 may further have peripheral lips 908 formed along its side edges, which may be configured for providing torsional rigidity and dimensional stability to mounting plate 900. In some embodiments, lips 908 may extend generally continuously about the entire perimeter of mounting plate 900; may be provided along one, two, or three of its edges only; or otherwise may be formed in a plurality of sections of different lengths. Lips 908 may extend substantially perpendicular to the plane defined by the central section of mounting plate 900. However, it is possible for lips 908 to extend at a different angle from that shown. In some embodiments, top edges of lips 908 may further be bent, e.g., outwardly at a right angle relative to lips 908, to form a substantially peripheral flange 908a surrounding mounting plate 900. In some embodiments, flange 908a may be used for mounting purposes, e.g., using mounting holes 910. In some embodiments, lips 908 may have a height of between 10 and 35 mm, and flange 908a may have a width of between 10 and 35 mm. Lips 908 and flange 908a may be formed by bending the edges of mounting plate 900 in a desired angle. In some embodiments, other types of lips, bent edges, and/or flanges may be used for lending increased torsional rigidity to mounting plate 900, including peripheral U- or V-shaped channels, and the like.

With continued reference to FIGS. 9A-9C, in some embodiments, mounting plate 900 may be configured for permitting a quick exchange in mid-operation of a mounting plate having a plurality of heated imprint blocks loaded within. As noted above with respect to imprinting station 800 in FIGS. 8A-8B, a plurality of imprint blocks 810 may be arranged within imprinting assembly 806. As also noted, imprint blocks of the present invention may have an operating temperature of between 200° and 600° C. In high volume production lines, when a need arises to change a set of imprint blocks mounted within an imprinting station 800 with a different set having a different pattern relief, a potential obstacle might be the need for a cooling-off period before the heated imprint blocks may be handled by operators without risk of injury or damage to equipment.

Figure 10:
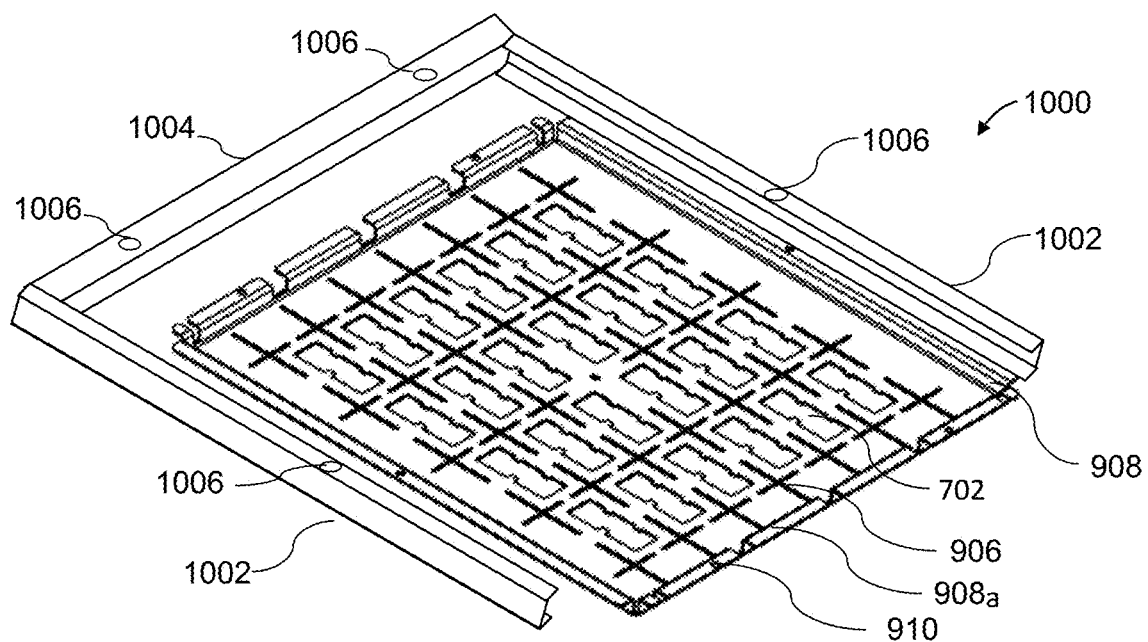
FIG. 10 illustrates an exemplary quick exchange mounting for a mounting plate, according to some embodiments of the invention.

Accordingly, with reference to FIG. 10, in some embodiments, a mounting plate 900, e.g., mounted within an imprinting assembly 806 of the present invention, may be configured for quick exchange while still loaded with a plurality of heated imprint blocks 810. In some instances, flange edges 908*a* may be received within a rail assembly 1000. Rail assembly 1000 may comprise two side rails 1002 and/or a back rail 1004, each configured, e.g., as a U-shaped channel and dimensioned for slidingly receiving flange 908*a*. In some embodiments, rail assembly 1000 may be fixedly coupled within imprinting assembly 806, so as to slidingly receive mounting plate 900 therein. In such variations, mounting plate 900, loaded with a plurality of imprint blocks 810, may be lifted using, e.g., a lift assist device. Mounting plate 900 may then be slidingly inserted into rail assembly 1000 and secured using, e.g., quick release pins through mounting holes 1006, which are corresponding to holes 910 in flange 908*a*. If, during operation, the need arises to replace the set of imprint blocks 812 loaded within mounting plate 900, mounting plate 900 may be slidingly pulled out of rail assembly 1000 using the lift assist device, and, e.g., a second mounting plate 900 loaded with a different set of imprint blocks 812 may be inserted in lieu thereof.

In other variations, at least side rails 1002 may be capable of being individually detached from imprinting assembly 806, e.g., be slidingly pulling side rails 1002 out. In such embodiments, during an exchange operation, mounting plate 900 may be supported using, e.g., a lift assist device, while side rails 1002 may be slidingly pulled out (wherein mounting plate 900 may still remain supported by back rail 1004). Mounting plate 900 may then be slidingly pulled via the lift assist device and replaced as described above.

In consideration of the relatively high temperature of the plurality of imprint blocks 506 carried within mounting plate 900 during an exchange operation, any securement means of mounting plate 900 to the imprinting assembly may be configured for quick-release with minimal usage of tools and/or handling time. For example, mounting plate 900 may be secured to rail assembly 1000 using multiple quick-release pins through holes 910 in flange 908*a* and corresponding holes 1006 in rail assembly 1000. Similarly, a single oversize-head bolt my attach mounting plate to the imprinting assembly, e.g., from the bottom through mounting hole 912. Thus, such quick-release pins and oversize-head bolt may be quickly removed without the need for using specialty tools and with minimum handling and/or exposure time.

Figure 11A:
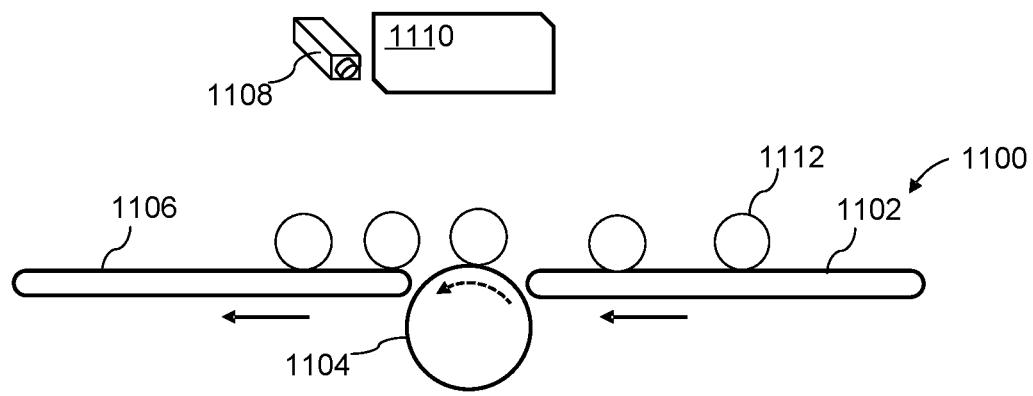
FIGS. 11A-11C schematically illustrate exemplary system for regulating the spacing of articles on conveying belts, according to some embodiments of the invention.
Figure 11B:
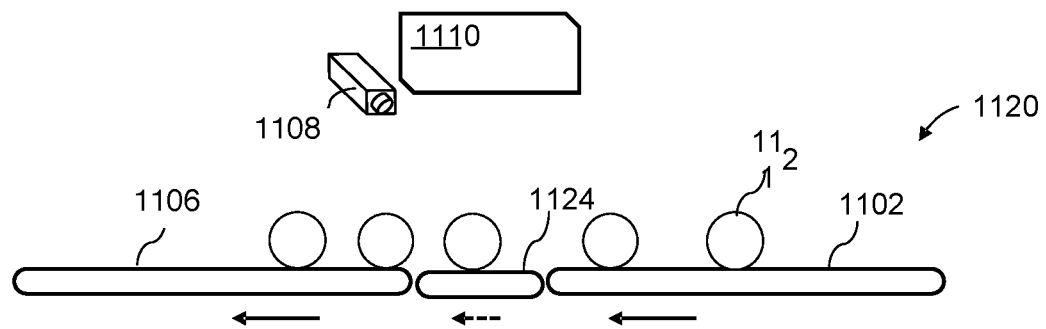
Figure 11C:
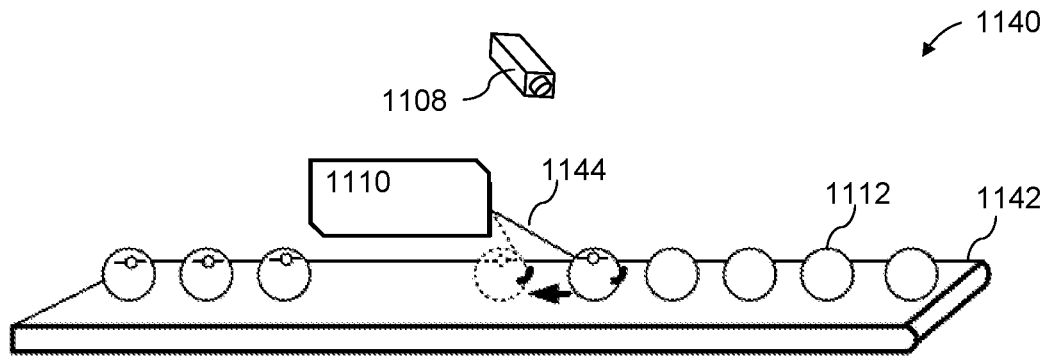

FIGS. 11A-11C schematically illustrate various systems for regulating the spacing between successive articles on conveying belts, in accordance with an embodiment. As noted above, certain embodiments of the present system may be incorporated within a conveyor-based production line. In such applications, food items for imprinting may be continuously conveyed, individually or in batches, to an imprinting station such as the one described with reference to FIGS. 8A-8B. Accordingly, the conveyance regulating systems of FIGS. 11A-11C may be employed as complementary systems for use in conjunction with such conveyor-based production line.

With reference to FIG. 11A, in some embodiments, a conveyance regulating system 1100 comprises an infeed belt 1102, a regulating roller 1104, a transporting belt 1106, a sensing unit 1108 and a controller 1110. In some embodiments, articles 1112.

With reference to FIG. 11A, in some embodiments, a conveyance regulating system 1100 comprises an infeed belt 1102, a regulating roller 1104, a transporting belt 1106, a sensing unit 1108 and a controller 1110. In some embodiments, articles 1112, which may be food items, individually or in batches, may be conveyed continuously via infeed belt 1102. At this stage, the spacing of articles 1112 on infeed belt 1102 may be irregular or unequal. Infeed belt 1102 transports the articles at a constant speed to regulating roller 1104. In some embodiments, regulating roller is aligned with infeed belt 1102, so as to receive articles 1112 and transfer them to transport belt 1106. Sensing unit 1108 may be configured for detecting the relative spacing of articles 1112 as they are coming in on infeed belt 1102. Sensing unit 1108 then transmits this data to controller 1110, which adjusts a rotating speed of regulating roller 1104 so as to decrease or increase, as the case may be, a distance between two successive articles 1112.

With reference to FIG. 11B, in some embodiments, a conveyance regulating system 1120 may comprise a regulating belt 1124, performing substantially a similar function to that of regulating roller of system 1120, Regulating belt 1124 may be aligned with infeed belt 1102, so as to receive articles 1112 and transfer them to transport belt 1106, In this variation, controller 1110 adjusts a conveying speed of regulating belt 1124 so as to decrease or increase, as the case may be, a distance between two successive articles 1112.

Yet another variation is depicted in FIG. 11C, a conveyance regulating system 1140 may employ a pusher arm 1144 configured for advancing or retarding articles 1112 on conveyor belt 1142, In some embodiments, sensing unit 1108 may be configured for detecting the relative spacing of articles 1112 as they are coming in on conveyor belt 1142. Sensing unit 1108 then transmits this data to controller 1110, which operates pusher arm 1144 so as to advance or retard, as the case may be, an article 1112, thereby adjusting a distance between two successive articles 1112.

What is claimed is:
1. A food imprinting system comprising:
   at least one imprint block; and
   a mounting plate having
      at least one opening dimensioned for receiving at least a forward portion including an imprinting face of said at least one imprint block; and
      a plurality of elongated through slots distributed substantially evenly about said mounting plate, wherein each slot has a length of between 50 and 150 mm and a width of between 2 and 6 mm.
   wherein said imprint block and said mounting plate are mounted within an imprinting assembly.
2. The system of claim 1, wherein said imprinting assembly is installed within a support frame comprising a support table, wherein said support table defines a plane which is substantially parallel to a plane defined by said printing face, and comprising an imprinting assembly driver configured for driving said imprinting assembly relative to said support table.

3. The system of claim 2, wherein said imprinting assembly driver is configured for driving said support table relative to said imprinting assembly.

4. The system of claim 1, wherein said mounting plate is made of a material configured for withstanding operating temperatures of up to 600° C.

5. The system of claim 1, wherein said at least one opening is dimensioned to form an air gap around said forward portion of said imprint block, wherein said air gap has a length of at least 0.1 mm.

6. The system of claim 1, wherein at least some of said slots comprise an elongated rod coupled at one or more ends of said slots and oriented along said slots.

7. The system of claim 1, wherein at least some of said slots comprise an elongated rod that traverses said slots and is coupled at one or more sides of said slots.

8. The system of claim 7, wherein said rod is made of a material having a coefficient of thermal expansion which is different to that of said mounting plate.

9. The system of claim 1, wherein said mounting plate further comprises a lip formed along at least a portion of a perimeter of said mounting plate, said lip extends substantially perpendicular to a plane defined by said mounting plate, and wherein said lip has a height of at least 10 mm.

10. The system of claim 9, wherein said lip further comprises a flange section which is oriented at a right angle to and outwardly away from said lip, wherein said flange has a width of at least 10 mm.

11. The system of claim 10, wherein said flange section comprises one or more mounting holes configured to receive locking pins.

12. The system of claim 1, wherein said imprint block comprises a shoulder extending outwardly relative to said forward portion of said imprint block, and said shoulder is dimensioned to be larger than said opening in said mounting plate for preventing passage of said shoulder therethrough.

13. The system of claim 12, further comprising a support ring disposed between said mounting plate and said imprint block shoulder.

14. The system of claim 13, wherein said support ring is dimensioned to form an air gap around said forward portion of said imprint block, wherein said air gap has a width of at least 0.1 mm.

15. The system of claim 13, wherein said support ring has a rim height of between 3 and 10 mm, and a rim width of at least 2 mm.

16. The system of claim 13, wherein said support ring is integrally formed with said mounting plate.

17. The system of claim 1, wherein also comprising a release plate.

18. The system of claim 17, wherein said release plate is configured to weigh down food items to a common height.

19. The system of claim 17, wherein said release plate is configured to prevent food items from lifting when said mounting plate and imprinting blocks are raised.

* * * * *